E. H. SCHMIDT.
DRAFT RIGGING.
APPLICATION FILED APR. 24, 1911.
1,176,723.
Patented Mar. 21, 1916.
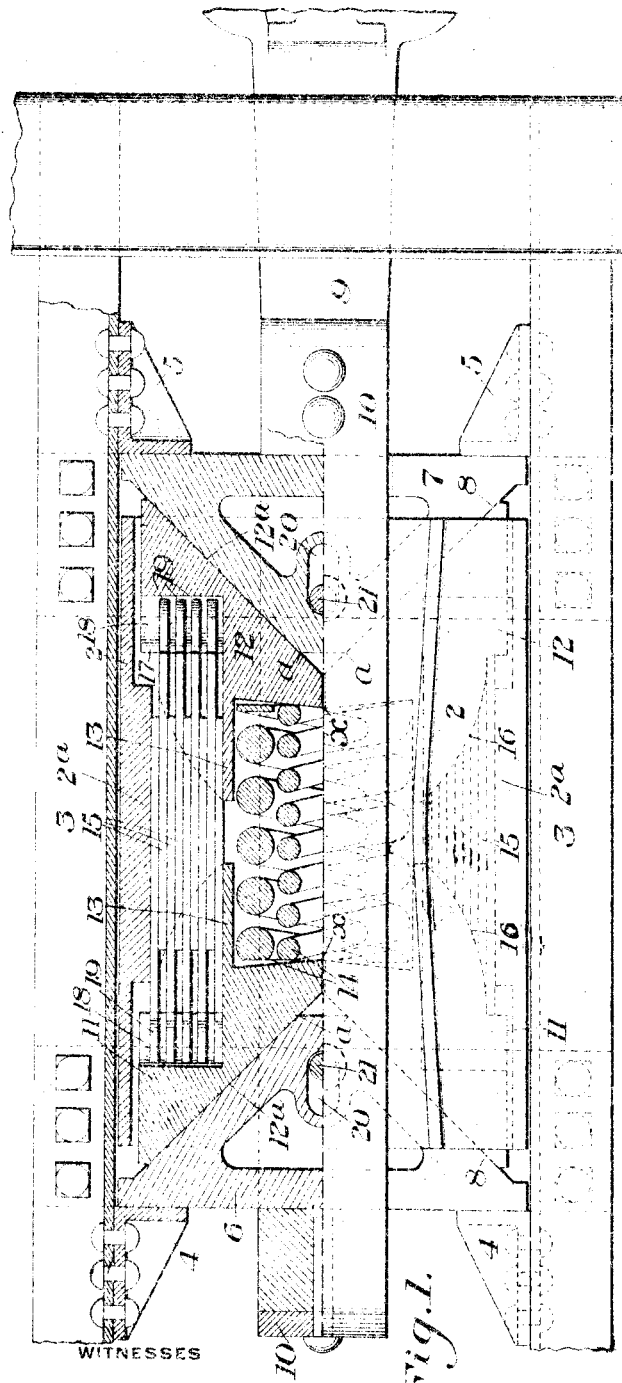
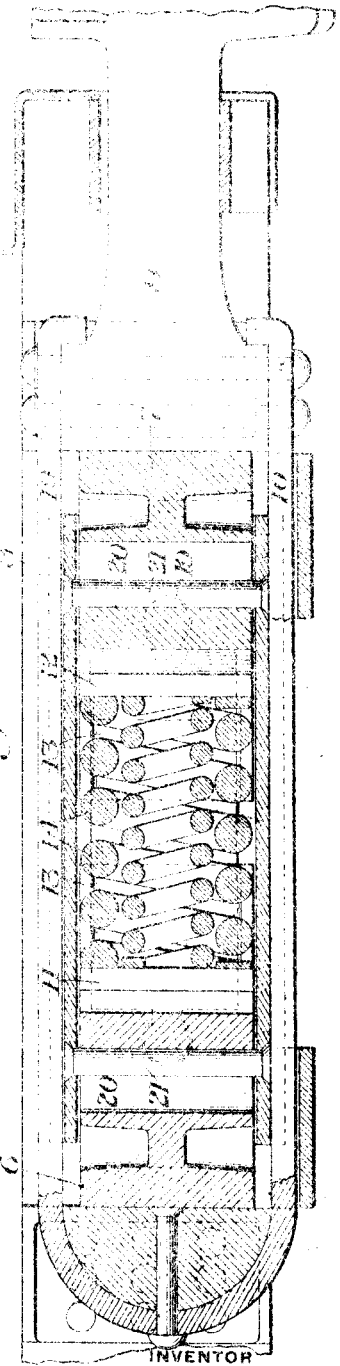
WITNESSES
R A Balderson
W Famaris
INVENTOR
E. H. Schmidt
by Bakewell, Byrnes & Parmelee
his Attys

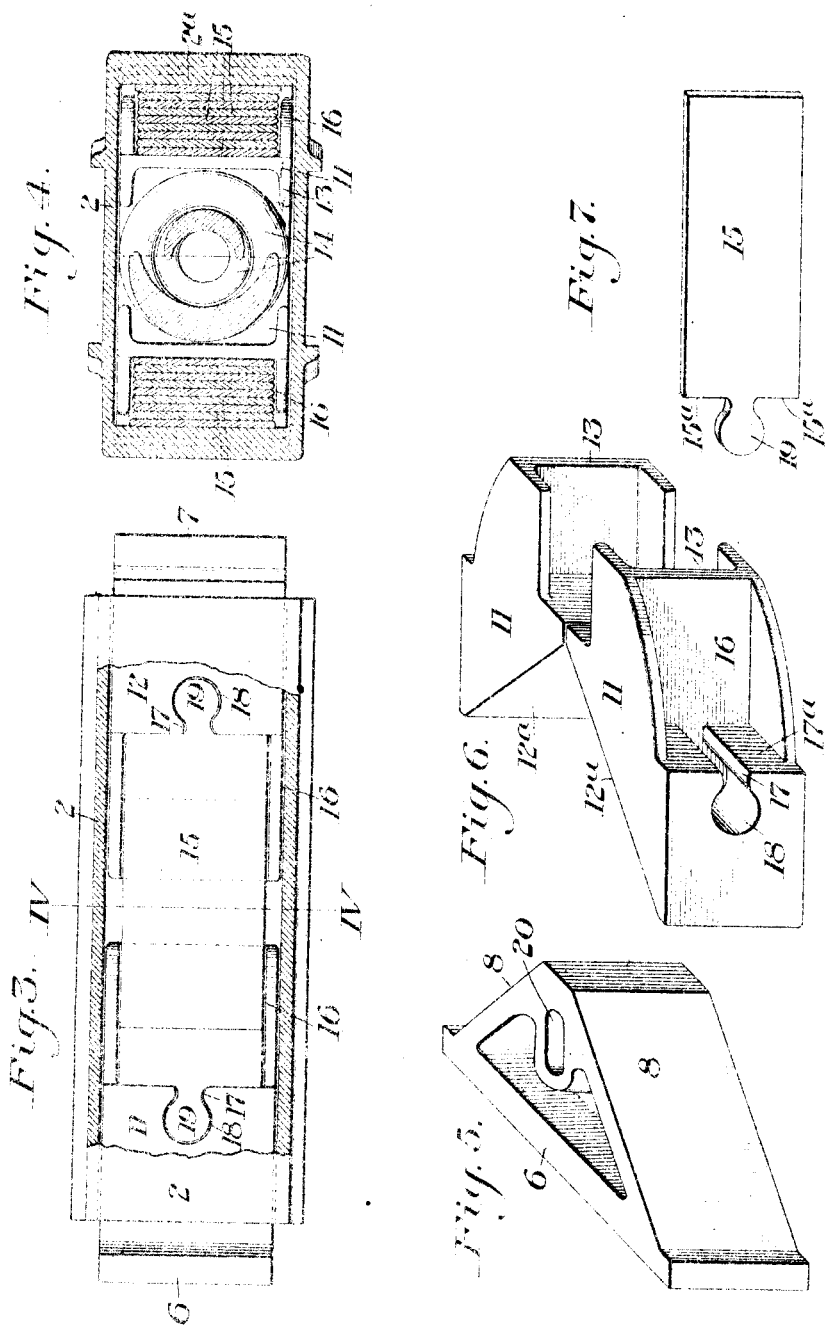

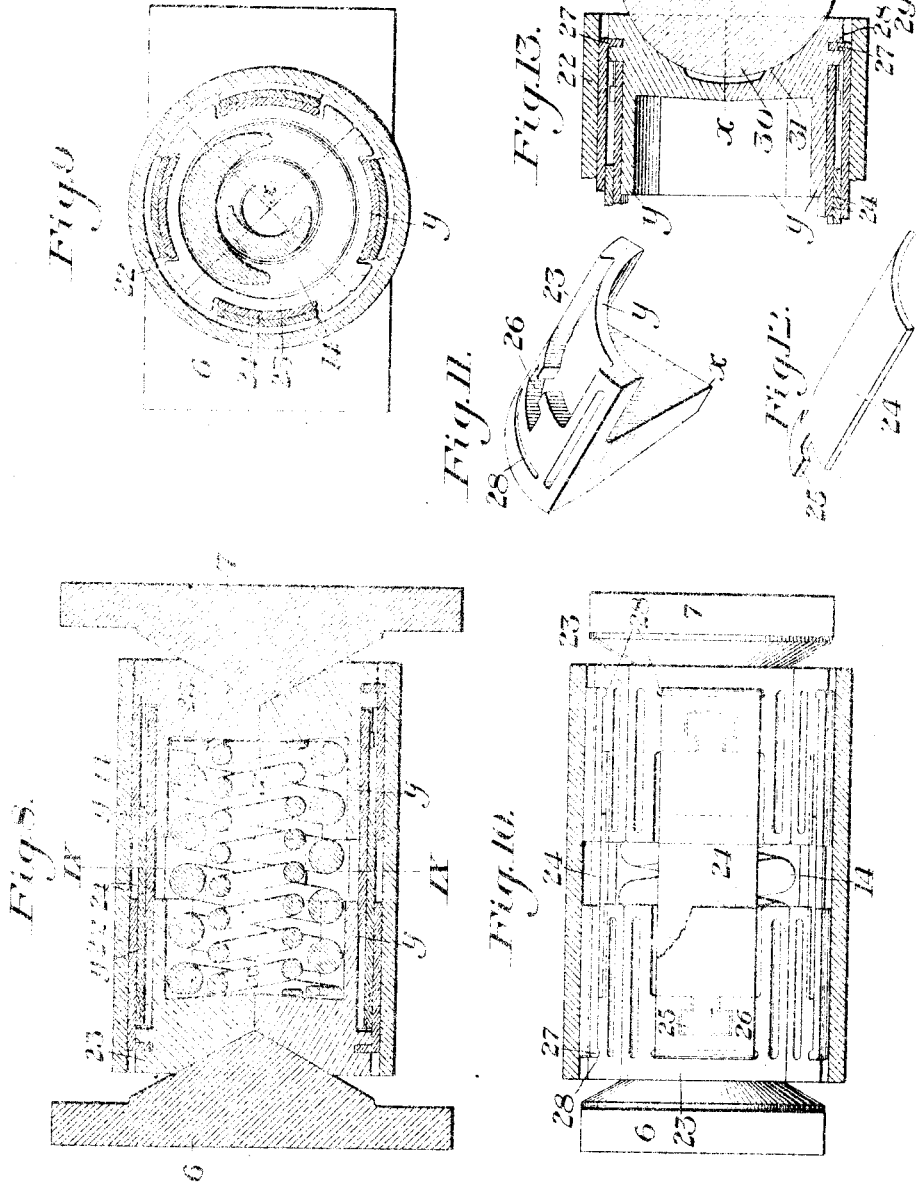

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

DRAFT-RIGGING.

1,176,723.  Specification of Letters Patent.  Patented Mar. 21, 1916.

Application filed April 24, 1911. Serial No. 622,914.

*To all whom it may concern:*

Be it known that I, ERNEST H. SCHMIDT, of Cleveland, Cuyahoga county, Ohio, have invented a new and useful Improvement in Draft-Riggings, of which the following is a full, clear, and exact description, reference being had to the accompanying drawings, forming part of this specification, in which—

Figure 1 is a view partly in plan and partly in horizontal section showing one form of my improved draft rigging applied; Fig. 2 is a longitudinal section of the same; Fig. 3 is a side view of the draft rigging of Figs. 1 and 2, with the casing partly broken away; Fig. 4 is a section on the line IV—IV of Fig. 2; Fig. 5 is a perspective view of one of the followers; Fig. 6 is a perspective view of one pair of the friction plate shoes; Fig. 7 is a perspective view of one of the friction elements; Fig. 8 is a longitudinal section of another form of my invention; Fig. 9 is a section on the line IX—IX of Fig. 8; Fig. 10 is a side view of the modified draft rigging with the casing in section; Fig. 11 is a perspective view of one of the friction plate shoes of Figs. 8, 9 and 10; Fig. 12 is a perspective view of one of the modified friction elements; and Fig. 13 is a detail sectional view showing a modification of the follower and friction plate shoes.

My invention has relation to friction draft riggings of that type in which there are a plurality of intercalated or overlapping friction resistance members; and is designed to provide a friction rigging of this character in which the friction plates or elements are connected with their actuating members in such a way as to obviate the necessity for connecting pins or rivets, and also the necessity for any spacers or distance pieces between the plates.

My invention provides a construction in which the friction elements can be very readily and easily assembled, and in which each plate or element is free to move as may be necessary to adjust itself to any wear that may take place between the plates or elements. It also provides means whereby any number or combination of these plates may be used, as may be necessary, in order to provide the desired friction capacity.

My invention also provides a draft rigging of this character, in which a very large friction resistance can be obtained with a relatively small friction-producing pressure, thereby obtaining the desired capacity with a working pressure sufficiently low to prevent excessive wear or abrasion.

Other objects and advantages of my invention will hereinafter appear.

Referring first to that form of my invention which is shown in Figs. 1 to 7, inclusive, the numeral 2 designates a suitable casing, which, in this instance is of rectangular form, and is open at both its ends. The draft rigging may be attached to the draft sills 3 in any suitable manner. I have shown it as seated between the draft sills, and between the rear stops 4 and the front stops 5. 6 designates a rear follower, which seats against the rear stops 4; and 7 is the front follower which seats against the front stops 5. Each of these followers is shown as having an inwardly projecting portion with the oppositely inclined bearing surfaces 8.

The numeral 9 designates the shank of the coupler, and its rear end abuts against the front face of the front follower; and 10 is a yoke attached to the coupler shank, and embracing the draft rigging and engaging the rear side of the rear follower 6 in the usual manner.

The numeral 11 designates a pair of rear friction plate shoes, and 12 a similar pair of front friction plate shoes. The shoes 11 are shown in detail in Fig. 6. Each shoe has an inclined inner face 12ᵃ which is adapted for contact with the adjacent inclined face 8 of one of the followers. The shoes are also formed with the extending portions 13, which form a pocket for the ends of the release springs 14.

The numeral 15 designates the intercalated friction members or plates. To receive these plates, each shoe is formed with the laterally open pocket 16, having in its end wall a keyhole shaped slot 17 with the rounded portion 18. Each of the friction members consists of a thin plate of metal having at one end a rounded projection 19, which is adapted to engage the slot 17 and fit the rounded portion 18 thereof.

The friction plates are arranged in sets at opposite sides of the release springs. Each set consists of two series of plates arranged in alternating relation, the plates of one set being carried by one of the forward friction plate shoes, and the plates of the other set being carried by one of the rear friction plate shoes. The outer plate of each set has a sliding bearing with the portion 2ᵃ of the casing, and the inner plate of each set has a bearing on the inner walls of the pockets 16.

Each of the follower members is provided with an elongated slot 20 to receive a pin or rivet 21, which is inserted therethrough after the parts have been assembled, for the purpose of retaining them within the casing. The elongation of the slot is sufficient to permit the followers to have the necessary longitudinal buffing and draft movements.

When the friction plates are inserted in the pockets and recesses of the friction plate shoes, the square shoulders 15ᵃ thereof at each side of the projection 19 bear against the corresponding shoulders or surfaces 17ᵃ adjacent to the recess 17 of the friction plate shoes, thus giving them full bearing across nearly their entire width, and which is effective in pushing the plates when in frictional contact with each other.

The operation will be readily understood. When a pulling force is applied by the coupler to the yoke, the rear follower is drawn forwardly, the front follower being held immovable by its engagement with the stops 5. This pressure put upon the rear follower and resisted by the springs 14, causes a spreading action upon the friction plate shoes, which is transmitted through these shoes of the intercalated friction plates. The friction plates are thereby caused to slide upon each other under pressure, each one of them exerting a friction resistance in proportion to the pressure applied on the wedging faces of the shoes and followers. In buffing, the operation is substantially the same except that the rear follower is held fixedly against the stops 4, while the front follower is forced rearwardly by the coupler shank.

In the form shown, each follower, together with the pairs of friction plate shoes are arranged to enter the casing by an amount equal to one-half of the total travel of the rigging, since the casing is open at both ends. It will be obvious, however, that one of the follower members might constitute a closed end of the casing, in which case the movable follower will take up the entire movement, the immovable follower simply providing pressure faces for engagement with the friction plate shoes with which it is in contact.

In the modification of my invention shown in Figs. 8 to 12, the case or barrel 22, instead of being rectangular, as in the form first described, is of cylindrical form. The friction plate shoes 23 are also of curved segmental form, and the friction plates or elements 24 are correspondingly curved to conform to the inner contour of the barrel. I have also shown the friction plates as having T-shaped projections 25, which are arranged to seat in correspondingly shaped slots 26 of the friction shoe plates. In this form also the outer friction plate of each group is of a slightly different form from the others, in that its end portion 27 is bent inwardly to engage a slot 28 in the friction shoe plate, as shown in Fig. 8. In this form I have shown four sets of the friction elements, but it will be understood that a greater or less number of sets may be employed, as may be desired.

The modification illustrated in Fig. 13 is similar to that last described, except that I provide the followers, one of which is shown at 29, with a rounded projection 30, for engagement with the friction shoe plates, instead of an angular beveled projection. The engaging faces of the shoe plates are correspondingly shaped, as shown at 31.

I preferably provide means whereby the wedge engagement of the followers and the friction plate shoes will always be prevented from sticking, any tendency to which might keep the draft rigging from releasing properly after the removal of the compressive force. By reference to Figs. 1, 8 and 11, it will be noted that the portions of the friction shoes which form seats for the springs 14, slope toward the center and have their highest points at $x$. The pressure of the releasing springs upon these inwardly sloping edges causes the friction shoes to be tipped or tilted, thereby releasing their portions $y$ from pressing engagement with the intercalated friction plates, and releasing their contacting surfaces from wedging engagement with the followers 6 and 7, so that sticking is prevented. The same action will occur with the construction shown in Fig. 13.

By reference to Fig. 1, it will be seen that by making the inner ends of the friction shoes tapering as shown, the tilting action of the springs may be further assisted by the fact that the shoes can tilt or rock about the corners $a$ of each of the followers 6 and 7, the apex of the edge of each of the followers being made blunt for this purpose. In practice, this construction and arrangement brings about a sure and easy release of the wedging surfaces, overcoming any tendency they may have to stick or to grind into each other.

By reason of the manner in which the friction plates or elements are connected or engaged with the shoe plates, I avoid the necessity for any connecting pin or rivet, and also the necessity for spacers or distance pieces. This greatly increases the ease of assembling, and is also an improvement in the operation, since each friction plate is free to move inwardly or outwardly within its slot to automatically adjust itself to wear which may take place between the plates, without the necessity of bending them, as would be the case if their ends were forced to remain in a fixed position. The fact that the friction plates are entirely loose and can be easily removed, affords an opportunity of putting in any number or combination of plates that may be necessary. Thus, if it is necessary to double or treble the friction capacity of the rigging, this can be done by decreasing the thickness of the plates and doubling or trebling their number. In this manner the capacity can be increased to almost any practicable extent.

An important advantage of a frictional device of this character lies in the fact that a very large friction resistance can be secured with but a relatively small frictional or friction-producing pressure. With but a single pair of plates rubbing against each other, if it is desired to produce a certain frictional resistance, it is necessary to generate between the rubbing surfaces a pressure transverse to the line of movement of several times the desired frictional resistance. If the number of plates is doubled, only about one-half this friction generating pressure will be necessary to produce the same frictional resistance; and this holds true with any further increase in the number of inter-engaging surfaces. Therefore, any desirable unit pressure, or pressure in pounds per square inch, can be provided which will bring the working pressure so low that the rubbing of the surfaces of the friction elements will not cause excessive wear or abrasion.

By engaging the friction plates with the shoes in the manner described, an easy method of taking up wear is also provided, since a thin plate of any desired thickness can be inserted to act as a shim to take up any wear that has taken place, after which the draft rigging will be in the same condition as when first put in service. The friction plates can be easily stamped from steel plates having smooth, flat surfaces, which will not change their condition throughout the life of the gear, as is the case where castings having rough surfaces are employed.

A draft rigging constructed in the manner herein described, admits of great variation in the various castings employed in the construction, since the plates, by reason of their loose engagement with the shoe members, will readily adjust themselves to such irregularities as may occur. By placing the draft springs under initial compression, sufficient to cause the shoes to be forced constantly outwardly by reason of their engagement with the followers, the plates may always be held in tight contact with each other, and with the shoes and walls of the casing, even though there may be considerable variation in the sizes of the castings.

I do not desire to limit myself in the broader claims to the use of wedge means, such as described for actuating the friction members, since it is obvious that these may be actuated in various other ways.

What I claim is:—

1. In a friction draft rigging, a pair of oppositely facing wedges, shoes and springs interposed between said wedges, and a series of intercalated friction elements actuated by said shoes, substantially as described.

2. In a friction draft rigging, friction plates, a friction plate carrier having an inclined or sloping spring seat, and a spring adapted to bear against said spring seat and thereby to rock said carrier for releasing the friction plates.

3. In frictional shock absorbing mechanism, a spring, a wedge, shoes interposed between the wedge and spring and actuated longitudinally and laterally by the wedge, substantially all of the pressure being transmitted directly through the wedge to said shoes, sets of friction elements carried longitudinally and pressed laterally by each of said shoes, and additional sets of friction elements interposed between the elements of the first named sets, said additional sets of friction elements being movable in a direction opposite to said first named sets.

4. In a friction draft rigging, a draft member, front and rear wedge members arranged to be actuated in reverse directions by the draft member, a plurality of friction plates, carriers having wedge surfaces engaging said wedges, and a plurality of intercalated friction plates mounted in said carriers, together with a spring interposed between the opposing carriers, substantially as described.

In testimony whereof, I have hereunto set my hand.

ERNEST H. SCHMIDT.

Witnesses:
 CHESTER K. BROOKS,
 HARRY E. ORR.